US007513763B1

(12) United States Patent
Singh et al.

(10) Patent No.: US 7,513,763 B1
(45) Date of Patent: Apr. 7, 2009

(54) TIRE PRESS CENTER MECHANISM

(75) Inventors: Anand Pal Singh, Akron, OH (US); Deane Robert Hamilton, Louisville, OH (US); Thomas Anthony Wasik, Akron, OH (US); Sivaram Addanki Krishnayya, Hudson, OH (US); William Forte Franchim, Youngstown, OH (US)

(73) Assignee: McNeil & NRM, Inc., Akron, OH (US)

( * ) Notice: Subject to any disclaimer, the term of this patent is extended or adjusted under 35 U.S.C. 154(b) by 65 days.

(21) Appl. No.: 11/809,648

(22) Filed: Jun. 4, 2007

(51) Int. Cl.
*B29C 35/02* (2006.01)

(52) U.S. Cl. ............................ 425/48; 425/29; 425/171

(58) Field of Classification Search .................. 425/29, 425/43, 48, 52, 171
See application file for complete search history.

(56) References Cited

U.S. PATENT DOCUMENTS

| | | | | |
|---|---|---|---|---|
| 2,495,664 | A | 1/1950 | Soderquist | |
| 2,699,572 | A | 1/1955 | Soderquist | |
| 2,730,763 | A | 1/1956 | Brundage | |
| 2,775,789 | A | 1/1957 | Soderquist | |
| 2,808,618 | A | 10/1957 | Soderquist | |
| 2,970,342 | A | 2/1961 | Frolich et al. | |
| 3,976,409 | A | 8/1976 | Athey | 425/48 |
| 4,863,360 | A | 9/1989 | Chuchanis | 425/48 |
| 4,872,822 | A | 10/1989 | Pizzorno | 425/48 |
| 4,950,141 | A | 8/1990 | Maikuma et al. | 425/48 |
| 5,393,480 | A | 2/1995 | Pizzorno | 425/48 |
| 5,641,521 | A | 6/1997 | Sarumaru | 425/38 |
| 5,776,507 | A | 7/1998 | Ureshino et al. | 425/48 |
| 5,776,508 | A | 7/1998 | Irie | 425/36 |
| 5,798,123 | A | 8/1998 | Mitamura et al. | 425/29 |
| 6,062,837 | A | 5/2000 | Fukuda | 425/48 |
| 6,416,305 | B1 | 7/2002 | Singh | |

FOREIGN PATENT DOCUMENTS

| | | |
|---|---|---|
| GB | 1388055 | 3/1975 |
| JP | 3236912 | 10/1991 |

*Primary Examiner*—James Mackey
(74) *Attorney, Agent, or Firm*—Renner, Kenner, Greive, Bobak, Taylor & Weber

(57) ABSTRACT

A center mechanism (10) for manipulating a bladder (20) in a tire curing press (12) includes a lower plate ring (28) for carrying a lower bead (22) of the bladder (20), and an upper plate ring (60) for carrying an upper bead (24) of the bladder (20). The center mechanism (10) may also include a first piston chamber (45) and a second piston chamber (105) positioned radially interior from the first piston chamber (45). An outer piston assembly (37) is operative to selectively raise the lower plate ring (28) and an inner piston assembly (71) is positioned inside the outer piston assembly (37) and is operative to selectively raise the upper plate ring (60) relative to the lower plate ring (28). A guide (120) is coupled to the outer piston assembly (37) and is adapted to slidingly contact the inner piston assembly (71) to prevent relative rotation therebetween. Operating fluid is provided through a single port (52) to selectively raise the outer piston assembly (37) and the inner piston assembly (71). The port (52) is fluidly connected to the first chamber (45) and the second chamber (105).

17 Claims, 6 Drawing Sheets

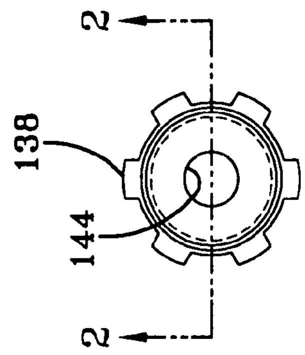
FIG—3
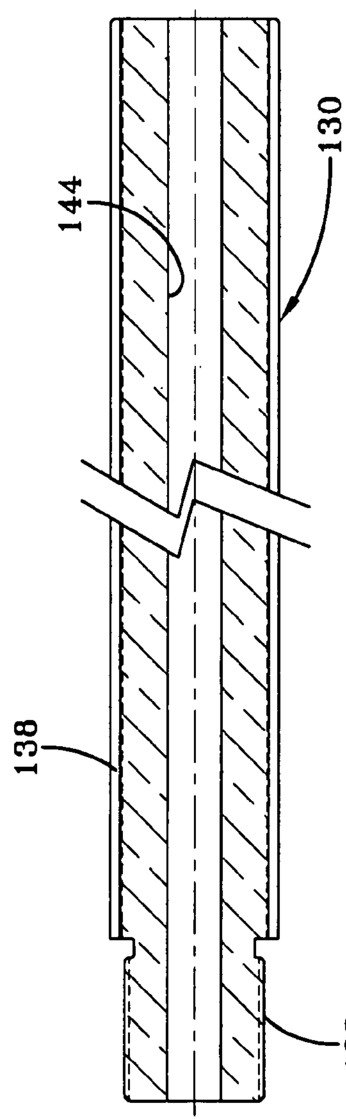
FIG—2
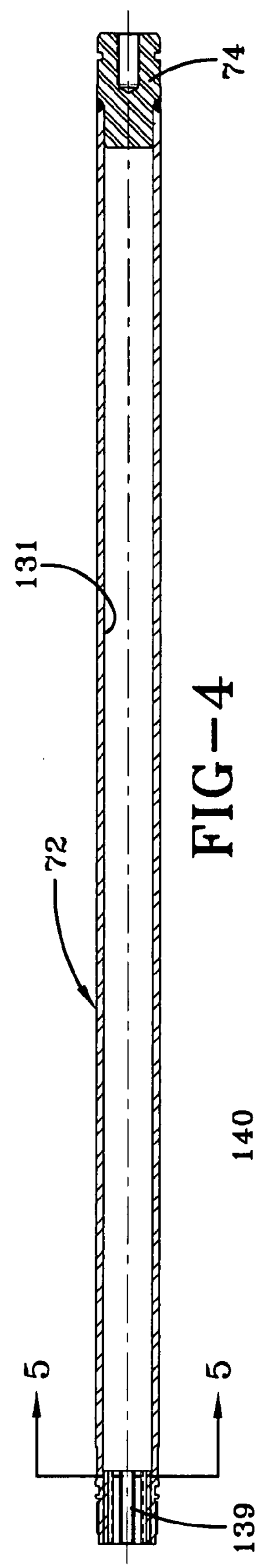
FIG—4
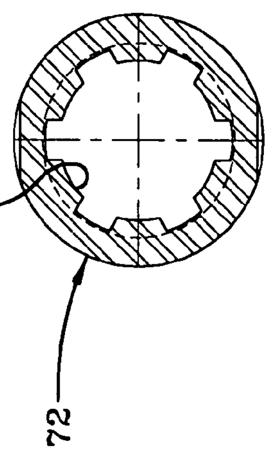
FIG—5

TIRE PRESS CENTER MECHANISM

TECHNICAL FIELD

The present invention relates generally to presses for shaping and curing tires. More particularly, the present invention relates to apparatus for positioning and holding an uncured tire within a press wherein the uncured tire is positioned and manipulated by a unique bag control or center mechanism configuration. More specifically, the present invention relates to a center mechanism that limits relative rotational movement between mold bladder bead areas. Further, the present invention relates to a center mechanism that accurately determines the position of the mold bladder.

BACKGROUND ART

Typical tire curing presses include a center mechanism which provides the primary interaction between the press and a green tire being processed by the press. While various types of center mechanisms have been developed over the years, the most common include a flexible, generally cylindrical bladder that is secured to the press and insertable within a green tire. These bladders may be radially distended in order to apply shaping and curing pressure as well as heat to the interior of the green tire. These center mechanisms are also capable of stripping the bladder from the tire after the curing process is completed.

In the past, the operation of a center mechanism bladder in conjunction with conventional bias-ply tires was relatively simple due to the cylindrical form of the uncured tire. Radial-ply tires, however, require more complex bladder manipulation. Green radial tire carcasses must be at least partially preformed before the breaker ply is positioned and affixed. Thus, prior to cure, the green tire approximates, to a substantial extent, the configuration of the cured tire. As a result, the bead-to-bead interior profile dimension of a green radial tire substantially exceeds the axial distance between the beads. Therefore, a bladder or bag that has an axial extent that approximates the bead-to-bead dimension will project a substantial distance above the upper bead of the tire when extended axially upwardly to receive the green tire. In such instances, controlled movement and positional monitoring of the upper and lower bead area of a bladder is significant in accurately concentrically locating the bladder within the tire to complete shaping and curing of a green radial tire.

Accurate placement and positional control of the bladder within a green tire is important to the eventual uniformity and performance of the resulting cured tire. It is advantageous to control not only the vertical axial positions of the bladder beads, but also the relative angular or rotational movement therebetween. Prior art center mechanisms fail to inhibit relative angular or rotational movement between the bottom and top bladder beads, which can lead to nonuniformity and other quality issues. Still other weaknesses in prior art center mechanisms include inaccurate positional measurement of the top and bottom bladder bead rings, which is, of course, critical information when receiving and removing tires therefrom. Further, prior art positional measurement devices are often bulky external devices that take up excess space and are susceptible to damage. Still further, prior art center mechanisms often require multiple pressure sources to drive individual pistons for both the lower bladder bead and the upper bladder bead. This configuration inherently adds complexity and cost to the center mechanism. Thus, existing center mechanisms have all involved at least a built-in or potential disadvantage that can materially affect tire quality and uniformity.

DISCLOSURE OF THE INVENTION

In general, a center mechanism of the present invention is disclosed for manipulating a bladder in a tire curing press and includes a lower plate ring adapted to carry a lower bead of the bladder. An upper plate ring is adapted to carry an upper bead of the bladder. A first piston chamber and a second piston chamber is provided wherein the second piston chamber is positioned radially interior from the first piston chamber. An outer piston shaft is operatively interconnected to a lower plate ring and received at least partially within the first piston chamber. An inner piston shaft is operatively interconnected to the upper plate ring and received at least partially in the second piston chamber. A main port is provided wherein operating fluid is provided through the main port to selectively raise the outer piston shaft and inner piston shaft, the main port being in simultaneous fluid communication with the first chamber, beneath the outer piston shaft and the second chamber, beneath the inner piston shaft.

In accordance with another embodiment of the present invention, a center mechanism is disclosed for manipulating a bladder in a tire curing press and includes a lower plate ring for carrying a lower bead of the bladder and an upper plate ring for carrying an upper bead of the bladder. An outer piston assembly is operative to selectively raise the lower plate ring and an inner piston assembly is positioned inside the outer piston assembly and is operative to selectively raise the upper plate ring relative to the lower plate ring. A guide is coupled to the outer piston assembly and is adapted to slidingly contact the inner piston assembly to prevent relative rotation therebetween.

In accordance with yet another embodiment of the present invention, a center mechanism is disclosed for manipulating a bladder in a tire curing press and includes an upper plate ring for carrying an upper bead of the bladder and a lower plate ring for carrying the lower bead of the bladder. A first piston chamber and a second piston chamber are included, wherein the second piston chamber is positioned radially interior from the first piston chamber. The outer piston assembly is operative to selectively raise the lower plate ring. The inner piston assembly is positioned inside the outer piston assembly and is operative to selectively raise the upper plate ring relative to the lower plate ring. A guide is coupled to the outer piston assembly and is adapted to slidingly contact the inner piston assembly to prevent relative rotation therebetween. A single port is provided, wherein operating fluid is provided through the single port to selectively raise the outer piston assembly and the inner piston assembly, the port being fluidly connected to the first chamber and the second chamber.

A preferred exemplary center mechanism according to the concepts of the present invention is shown by way of example in the accompanying drawings without attempting to show all the various forms and modifications in which the invention might be embodied, the invention being measured by the appended claims and not by the details of the specification.

BRIEF DESCRIPTION OF THE DRAWINGS

FIG. 2 is a sectional view taken substantially along line 2-2 of FIG. 3 depicting the guide shaft.

FIG. 3 is a plan view of the guide shaft.

FIG. 4 is a sectional view of the inner piston shaft.

FIG. 5 is a sectional view taken substantially along line 5-5 of FIG. 4 depicting the inner piston shaft.

PREFERRED EMBODIMENT FOR CARRYING OUT THE INVENTION

A center mechanism according to the concepts of the present invention is generally indicated by the numeral 10 and may be incorporated in various types and constructions of presses designed to shape and cure tires. While the center mechanism 10 is shown in conjunction with an exemplary hydraulic press, it should be appreciated that it is equally adaptable to various other hydraulic and mechanical presses.

Figure 1:
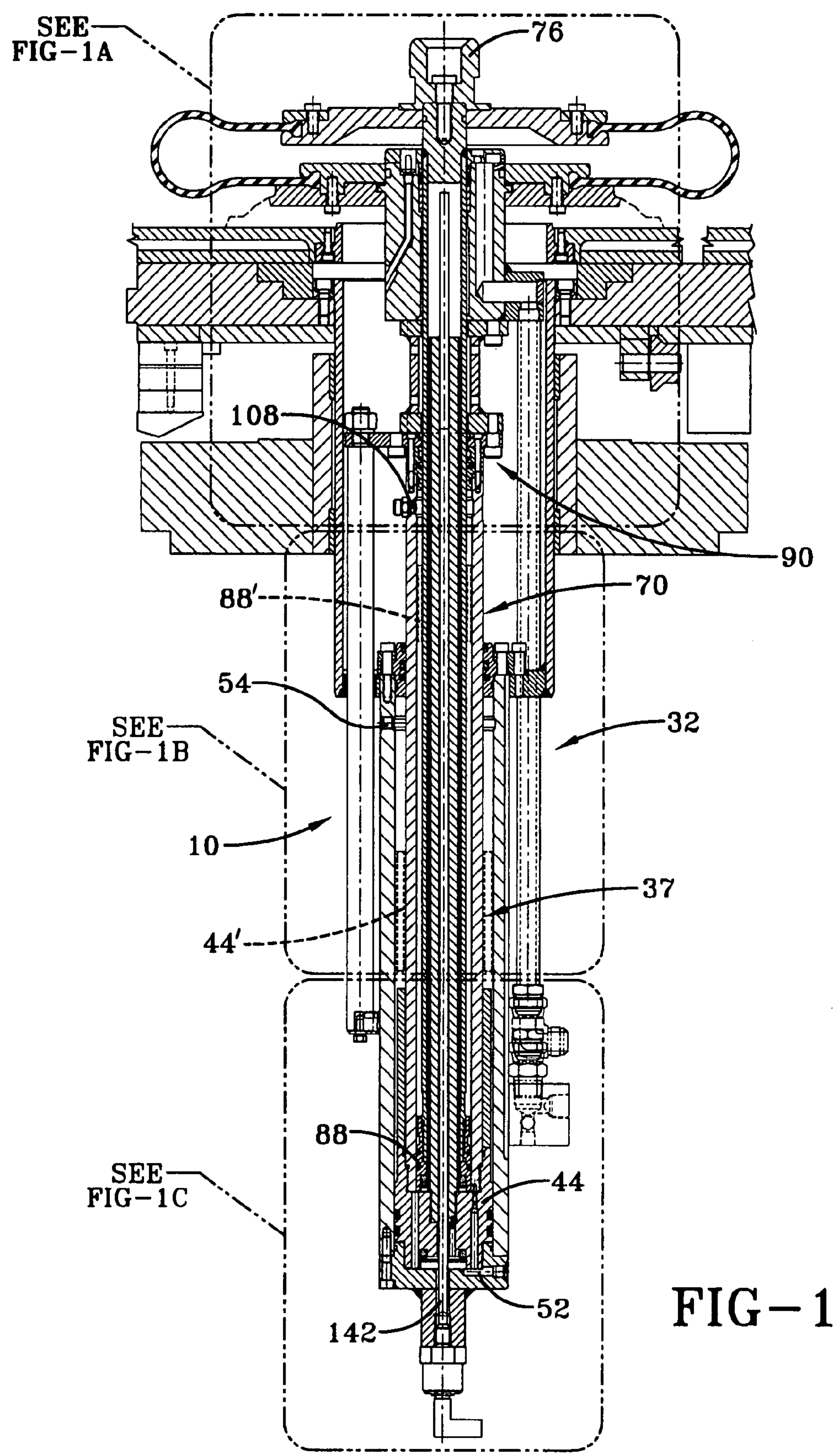
FIG. 1 is a sectional view of a portion of a tire press including a center mechanism embodying the concepts of the present invention
Figure 1A:
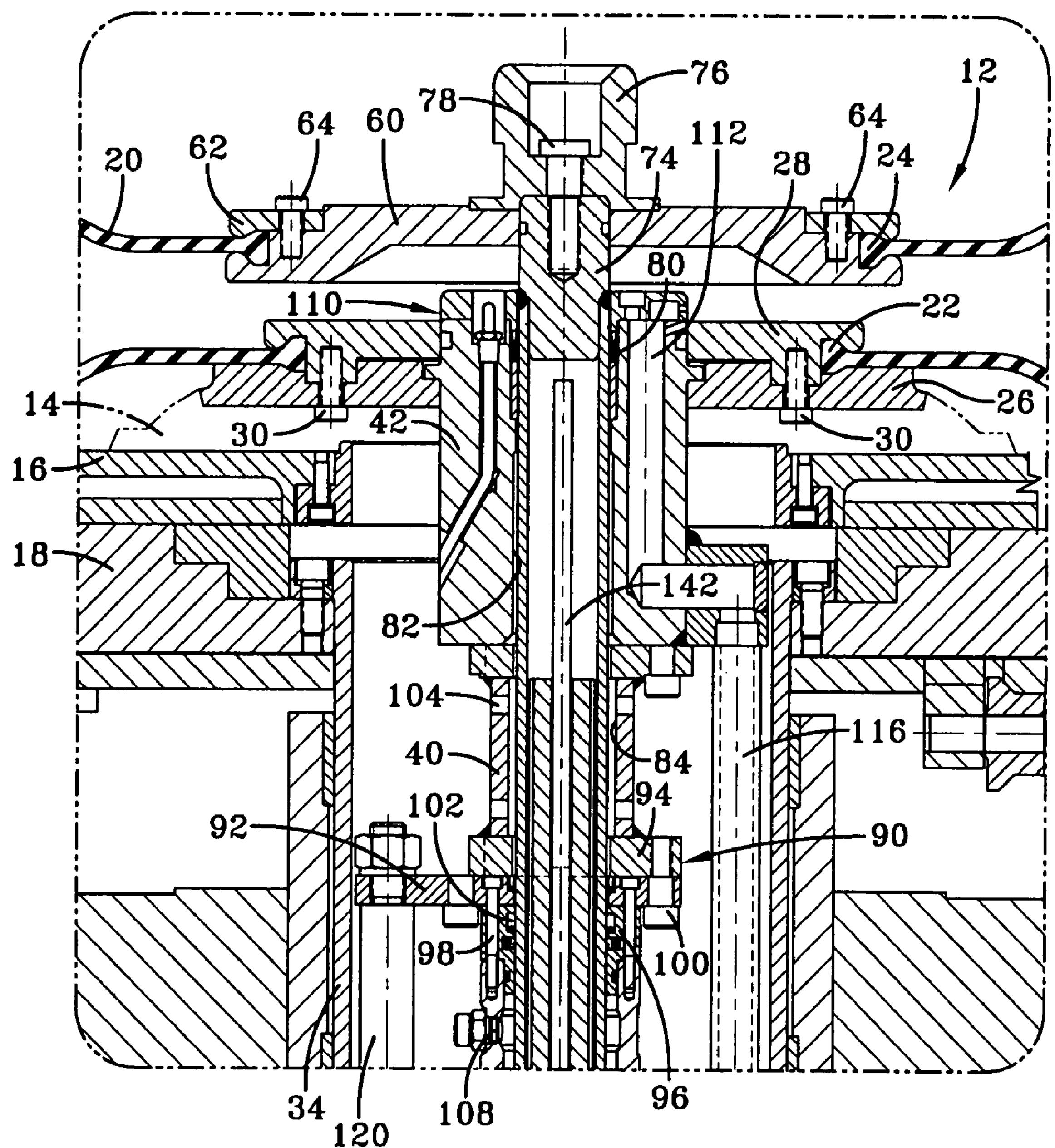
FIG. 1A is an enlarged sectional view of the top portion of the tire press of FIG. 1.

Referring particularly to FIGS. 1 and 1A, a portion of a suitable press, generally indicated by the numeral 12, is shown in sufficient detail for an understanding of the structure and operation of the center mechanism 10. Press 12 includes a lower mold section 14 (shown partially broken away) and a separable mating upper mold section (not shown). Center mechanism 10 is also equally suitable for use in conjunction with a press mounting segmented mold sections or adapted to mount both types of molds.

The lower mold section 14 is mounted on a platen 16 secured to a bolster 18 attached to a portion of the base of the press 12. The upper mold section is preferably similarly mounted on an upper platen (not shown) that is selectively movable with respect to the platen 16.

The bolster 18, platen 16, and lower mold section 14 are centrally apertured to receive the center mechanism 10. The portion of center mechanism 10 extending above the lower mold section 14 includes a flexible bladder, diaphragm or bag 20 that may be made of any number of suitable elastomeric materials well known to persons skilled in the art. As shown, the bag 20 is of the type that is open at both ends and is preferably of a generally annular configuration and symmetric about a horizontal centerline thereof. Further, the bag 20 may be of a substantially uniform wall thickness to provide a uniform transmittal of temperature and pressure from internally thereof to all portions internally of an uncured or green tire that it contacts.

The bladder or bag 20 has a lower bead area 22 and an upper bead area 24 that are clamped in a manner to be described to permit selective radial expansion and contraction of bag 20 upon the introduction of and withdrawal of fluids interiorly thereof. The lower bead area 22 of bag 20 is clamped between a lower clamp ring 26, which provides a seat for the lower bead of uncured tire, and a lower plate ring 28. Bladders may be changed when damaged or when processing uncured tires having different dimensions. In order to permit bladder removal, the lower clamp ring 26 and lower plate ring 28 are detachably secured as by bolts 30.

Figure 1B:
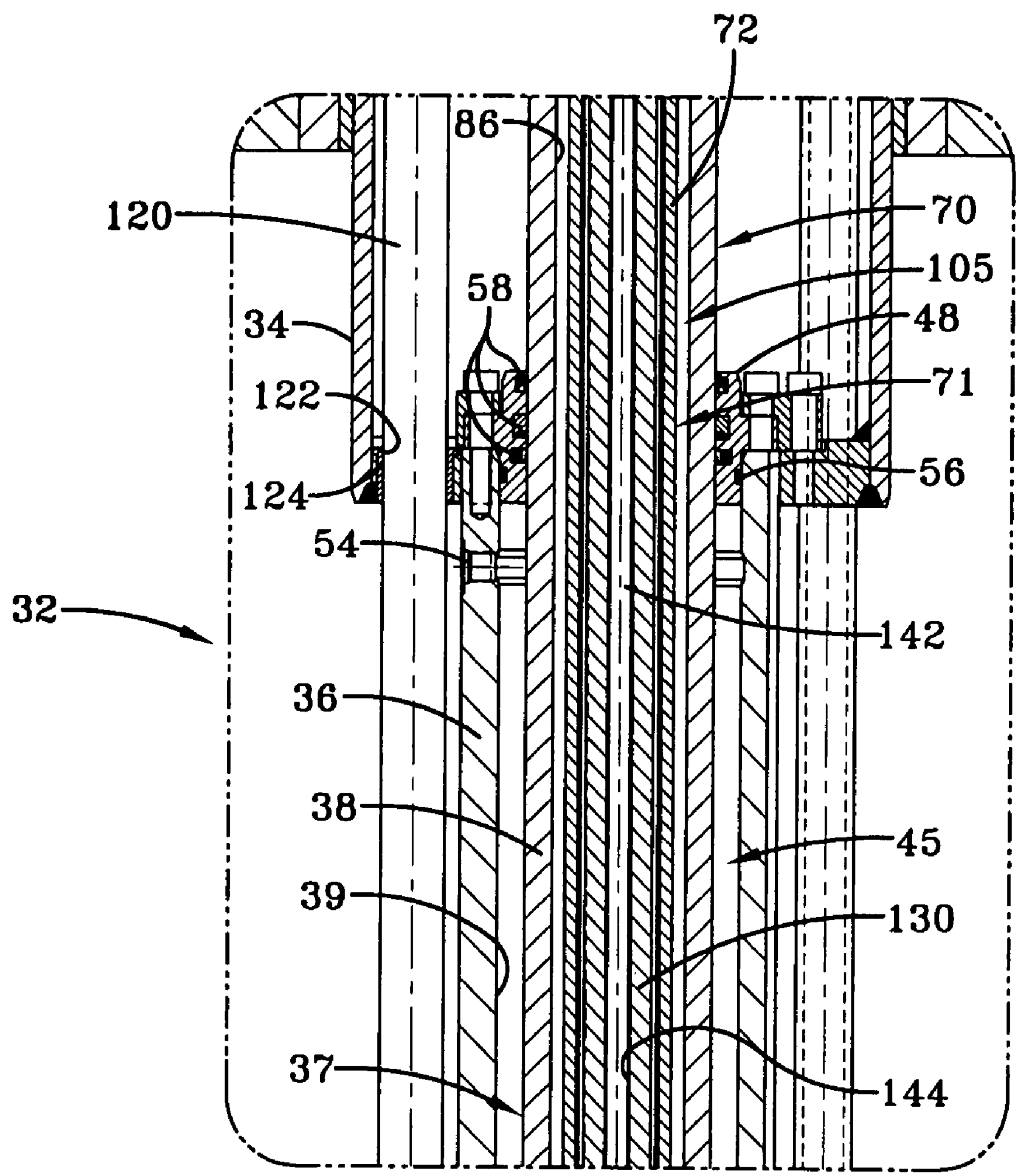
FIG. 1B is an enlarged sectional view of the middle portion of the tire press of FIG. 1.

The lower clamp ring 26 is selectively positioned in register with the lower mold section 14, as depicted in FIGS. 1 and 1A, or vertically extended thereabove by a cylinder mechanism, generally indicated by the numeral 32 and best shown in FIG. 1B. The cylinder mechanism 32 has a generally annular housing 34 that is fixed in the central bore of bolster 18. An outer cylinder 36 extends below, and is positioned generally concentric with, housing 34. An outer piston assembly, generally indicated by the numeral 37, includes an outer piston shaft 38 that partially received within interior bore 39 of outer cylinder 36. A vented coupler 40 (FIG. 1A) is positioned above outer piston shaft 38 and, as will be hereinafter discussed, provides a heat dissipative mechanical link between outer piston assembly 37 and a bladder mounting hub 42 positioned thereabove. Bladder mounting hub 42, in turn, includes exterior threads for selective attachment to the interiorly threaded lower plate ring 28. It should, however, be appreciated that any number of shaft coupling configurations may be employed. For example, shaft 38 could be coupled directly to bladder mounting hub 42, or an intermediary coupling device may be provided that provides a heat barrier through the introduction of a cooling agent.

Figure 1C:
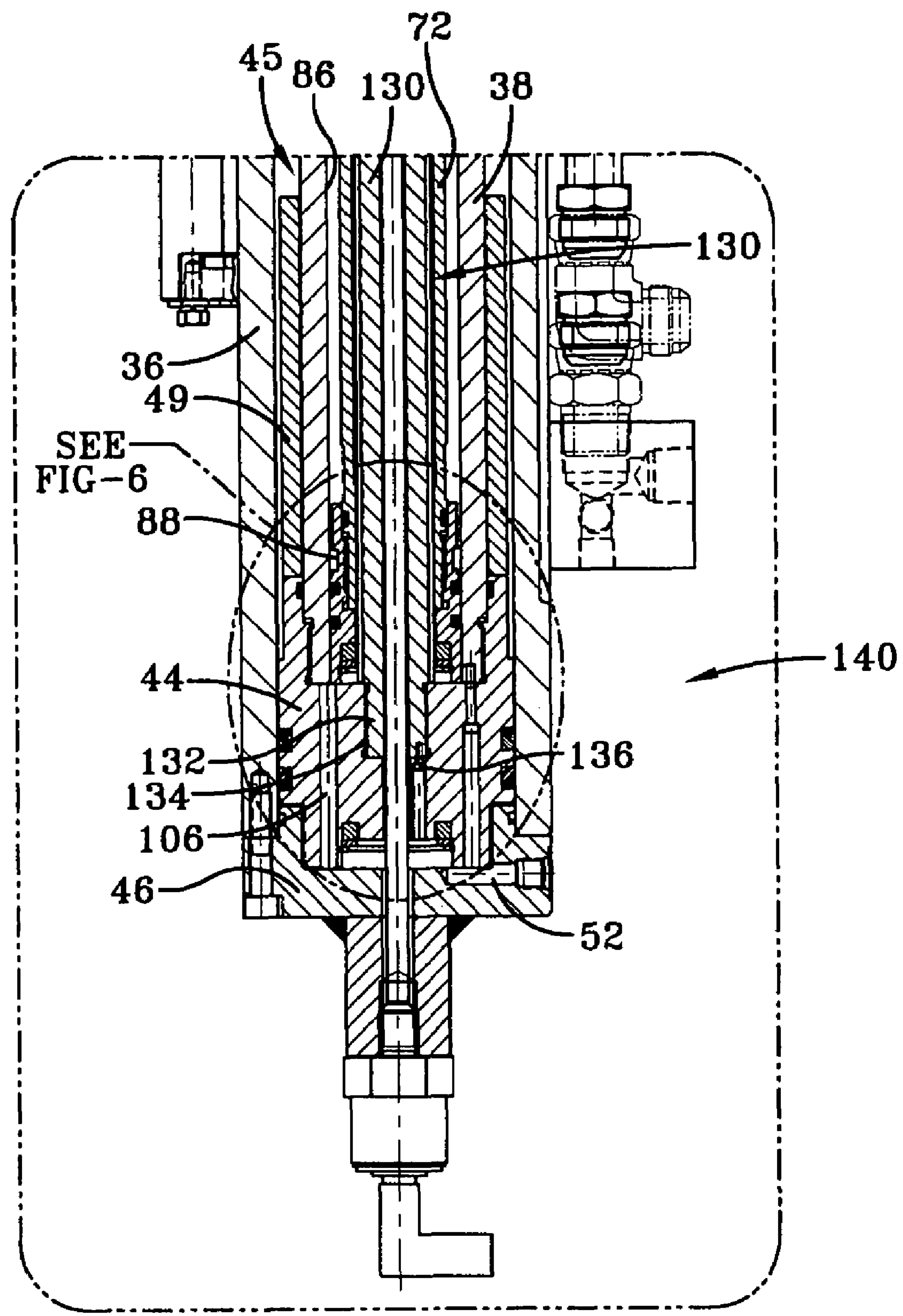
FIG. 1C is an enlarged sectional view of the lower portion of the tire press of FIG. 1.

The vertical actuation of lower clamp ring 26 is affected by outer piston assembly 37, which further includes an annular shaped outer piston 44 secured to outer piston shaft 38, and which selectively controllably moves within outer cylinder 36. The outer piston 44 is preferably secured to the lower extremity of outer piston shaft 38 and located within a chamber 45 formed by outer cylinder 36, a bottom cap 46 and a sealing collar 48. One or more seals 50 (see FIG. 6) may be provided about the circumferential surface of outer piston 44 that contact cylinder 36 to inhibit operating fluid transfer between the portions of chamber 45 above and below piston 44. Outer piston 44 moves axially between bottom cap 46 at the lower extremity of outer cylinder casing 36 and a position proximate to sealing collar 48 at the upper extremity of outer cylinder casing 36. Optionally, an annular spacer 49 (FIG. 1C) may be positioned above outer piston 44 to limit the vertical travel or stroke of outer piston 44. The stroke of piston 44 between the solid line position of FIG. 1 and the chain line position 44' is affected by the ingress and egress of operating fluid through a main port 52 in bottom cap 46 and an outer piston port 54 in outer cylinder 36, which communicate with chamber 45 below and above piston 44, respectively. The operating fluid is preferably oil or a water-glycol mixture wherein substantially higher pressures can be employed than with conventional water systems.

Leakage of operating fluid from chamber 45 is inhibited by an annular seal 56 that is positioned between sealing collar 48 and outer cylinder 36. Additional seals 58 may be positioned between sealing collar 48 and outer piston shaft 38 to prevent leakage therebetween.

The upper bead area 24 of bladder 20 is engaged between an upper plate ring 60 and a cooperating upper clamp ring 62 that are detachably secured together by bolts 64 for bladder change. The upper bead area 24 of bladder 20 is movable relative to lower bead area 22 to the extent necessary to provide the variation in bladder bead spacing required for the removal from and insertion into green tires. The movement of the upper bead, relative to the lower bead is accomplished by a second cylinder mechanism, generally indicated by the numeral 70. The second cylinder mechanism 70 includes an inner piston assembly 71 that is at least partially received within outer piston shaft 38 and is axially movable therein. Inner assembly 71 includes an inner piston shaft 72 that terminates at its upper end at a cap 74. Cap 74 may include an exteriorly threaded portion for attachment to the interiorly threaded portion of upper plate ring 60. Upper plate ring 60 may further be secured to cap 74 by an end mount 76, which is secured to cap 74 by a bolt 78. Inner piston shaft 72 extends through and is supported by a seal pack 80 positioned within bladder mounting hub 42 and which is designed to contain high pressure cure media within bladder 20. Piston shaft 72 extends downwardly from seal pack 80 and through a central bore portion 82 of bladder mounting hub 42, through a central bore portion 84 of vented coupler 40 and into a central bore 86 of outer piston shaft 38. Inner piston assembly 71 further includes an inner piston 88 that is coupled to the bottom end of inner piston shaft 72 and positioned within central bore 86 for reciprocal movement therein. One or more seals 89 (see FIG. 6) may be provided about the circumferential surface of inner piston 88 that contact outer piston shaft 38 to inhibit operating fluid transfer between portions of central bore 86 above and below piston 88. Piston shaft 38 thus serves as a cylinder casing for piston 88.

Hub 42 and outer piston shaft 38 are mechanically interlinked but maintained in fluid-tight and heat-transfer separation by a connector assembly, generally indicated by the numeral 90. As best shown in FIG. 1A, a bracket 92 is interposed between a radially extending flange 94 at the lower extremity of vented coupler 40 and a seating collar 96 secured to the upper end of outer piston shaft 38 as by bolts 98. The flange 94 and bracket 92 are joined by a plurality of bolts 100 spaced circumferentially thereabout. A plurality of seals 102 are positioned between seating collar 96 and inner piston shaft 72 to maintain the operating fluid within bore 86.

Both bracket 92 and the vented coupler 40 help prevent the transfer of heat from the curing media in bladder 20 and mold section 14 to the operating fluids for pistons 44 and 88. A heat barrier is further enabled by a plurality of apertures 104 on vented coupler 40 that permits air to circulate therethrough.

Inner piston 88 is secured to the lower extremity of inner piston shaft 72 and positioned within a chamber 105 formed by outer piston shaft 38, outer piston 44 and seating collar 96. Movement of inner piston 88 is effected by the controlled ingress and egress of operating fluid through a plurality of circumferentially spaced, axially extending bores 106 through outer piston 44. Because bores 106 extend completely through outer piston 44, fluid connection is achieved between main port 52 and chamber 105 below inner piston 88. Also in fluid communication with chamber 105 is an inner piston port 108 extending through outer piston shaft 38 proximate to bracket 92. Thus, the stroke of piston 88 between the solid line position of FIG. 1 and the chain line position 88' is affected by the ingress and egress of operating fluid through main port 52 and inner piston port 108, which communicate with chamber 105 below and above piston 88, respectively. It should be appreciated that, though it is possible to drive both pistons upwardly at the same time, as will become evident, it is desirable that only one piston be raised at a time so that a greater degree of control is maintained. Specifically, if both pistons are driven upward at the same time, it may become difficult to control the relative distance therebetween.

It should thus be evident that both the outer and inner pistons 44 and 88 are driven upwardly by operating fluid provided from a common pressurized operating fluid source, through main port 52. Pressurized operating fluid may also be provided to the chambers 45 and 105 through ports 54 and 108. Further, operating fluid may be allowed to evacuate from chambers 45 and 105 through ports 52, 54, and 108. When operating fluid is free to evacuate the chamber, the port is considered open. Operating fluid may also be blocked or effectively closed. The closure of a port may be accomplished by any means, for example, a valve assembly may be employed that prevents operating fluid evacuation through the respective port. In another embodiment, operating fluid may be provided to the respective port at a pressure approximately equal to the chamber pressure. In this manner, no operating fluid would move in or out of the chamber through the respective port.

When it is desired to affect upward movement of outer piston 44, outer piston port 54 is opened and inner piston port 108 is closed. While in this configuration, pressurized operating fluid supplied through main port 52 will urge outer piston 44 upwardly, and the fluid present within chamber 45, above outer piston 44, will be evacuated through outer piston port 54. Inner piston 88, will not be urged upwardly relative to outer piston 44 because inner piston port 108 is closed, and thus the fluid within chamber 105, above inner piston 88 prevents the relative movement. In this manner, outer piston 44, and consequently lower plate ring 28 may be raised. It should be appreciated that, though inner piston 88 does not rise relative to outer piston 44, it is carried upward the same distance as outer piston 44. This occurs because inner piston 88 is carried within outer piston shaft 38.

When it is desired to affect upward movement of inner piston 88, outer piston port 54 is closed and inner piston port 108 is opened. While in this configuration, pressurized operating fluid supplied through main port 52 will urge inner piston 88 upwardly, relative to outer piston 44, and the operating fluid present within chamber 105, above inner piston 88, will be evacuated through inner piston port 108. Outer piston 44 will not be urged upwardly because outer piston port 54 is closed, and thus the operating fluid within chamber 45, above piston 44, prevents upward movement. In this manner inner piston 88, and consequently upper plate ring 60, may be raised relative to bottom plate ring 28.

When it is desired to affect downward movement of both inner and outer pistons 44 and 88, main port 52 may be opened and pressurized operating fluid may be supplied to both outer piston port 54 and/or inner piston port 108. This forces pistons 44 and 88 downward, and forces the operating fluids below each piston to evacuate through main port 52.

Referring now to FIG. 1A, hub 42 is provided with a cap plate 110 that is positioned internally of the bladder 20. Cap plate 110 includes a passage 112 that exits internally of the bladder 20 and provides for the input and output of curing media, as previously described, internally of the bladder 20. The ingress and egress of curing fluid through passage 112 thus supplies the shaping and curing fluids employed in press operating cycles during the shaping and curing of green tires and the drainage of the curing media subsequent to the curing cycle. Passage 112 may be serviced in a conventional manner by pipes 116 attached to hub 42.

The alignment of outer piston shaft 38 during its reciprocal movement is aided by a downwardly extending support shaft 120 secured to bracket 92. Support shaft 120 is received through the aperture 122 of a stationary guide sleeve or bushing 124 that is secured to annular housing 34. As outer piston shaft 38 reciprocally moves, support shaft 120 slides through aperture 122, thereby limiting rotational and lateral displacement of shaft 38 relative to mold 14.

The rotational and axial alignment of inner piston shaft 72 is aided by a piston guide 130 that is positioned within an axially extending guide bore 131 of inner piston shaft 72. Piston guide 130 is coupled to a control portion of outer piston 44. To that end, piston guide 130 includes an undercut portion 132 that is received in an annular stepped bore 134 of outer piston 44. One or more fasteners 136 secure piston guide 130 to outer piston 44 and thereafter prevent removal or relative rotational movement. Further, undercut portion 132 may be provided with threads that engage corresponding threads in stepped bore 134. Guide 130 may include a plurality of radially extending splines 138 (See FIGS. 2 and 3) along the axial length thereof. Splines 138 are adapted to matingly engage an inner grooved portion 139 (FIG. 4) of inner piston shaft 72. Inner grooved portion 139 may include a plurality of axially projecting grooves shaped to receive splines 138. The engagement of inner grooved portion 139 and splines 138 prevent relative rotation between inner piston shaft 72 and outer piston shaft 38. Further, the engagement promotes proper lateral alignment of inner piston shaft 72 during reciprocal movement. By restricting rotational movement of inner piston shaft 72, unwanted and uncontrolled rotational movement of upper plate ring 60 is inhibited. Prevention of this undesirable rotational movement improves tire uniformity and quality.

Though the present embodiment discloses a plurality of mating grooves and splines on the hollow interior of inner piston shaft 72 and the piston guide 130, other configurations may be employed. For example, piston guide 130 could include an elliptical cross-sectional shape and the cross-section of the interior portion of inner piston shaft 72 could include a matching cross-sectional shape. Still further, the matching cross-sectional shapes could be square or rectangular. Still further, piston guide 130 could include a generally circular cross-section having an axially extending slot. In such a configuration, the inner piston shaft 72 could include one or more tabs received with the slot. Still further, though the present invention discloses inner grooves 139 along only a small portion of inner piston shaft 72 proximate to the bottom end, inner grooves 139 could extend the entire axial length thereof.

Figure 6:
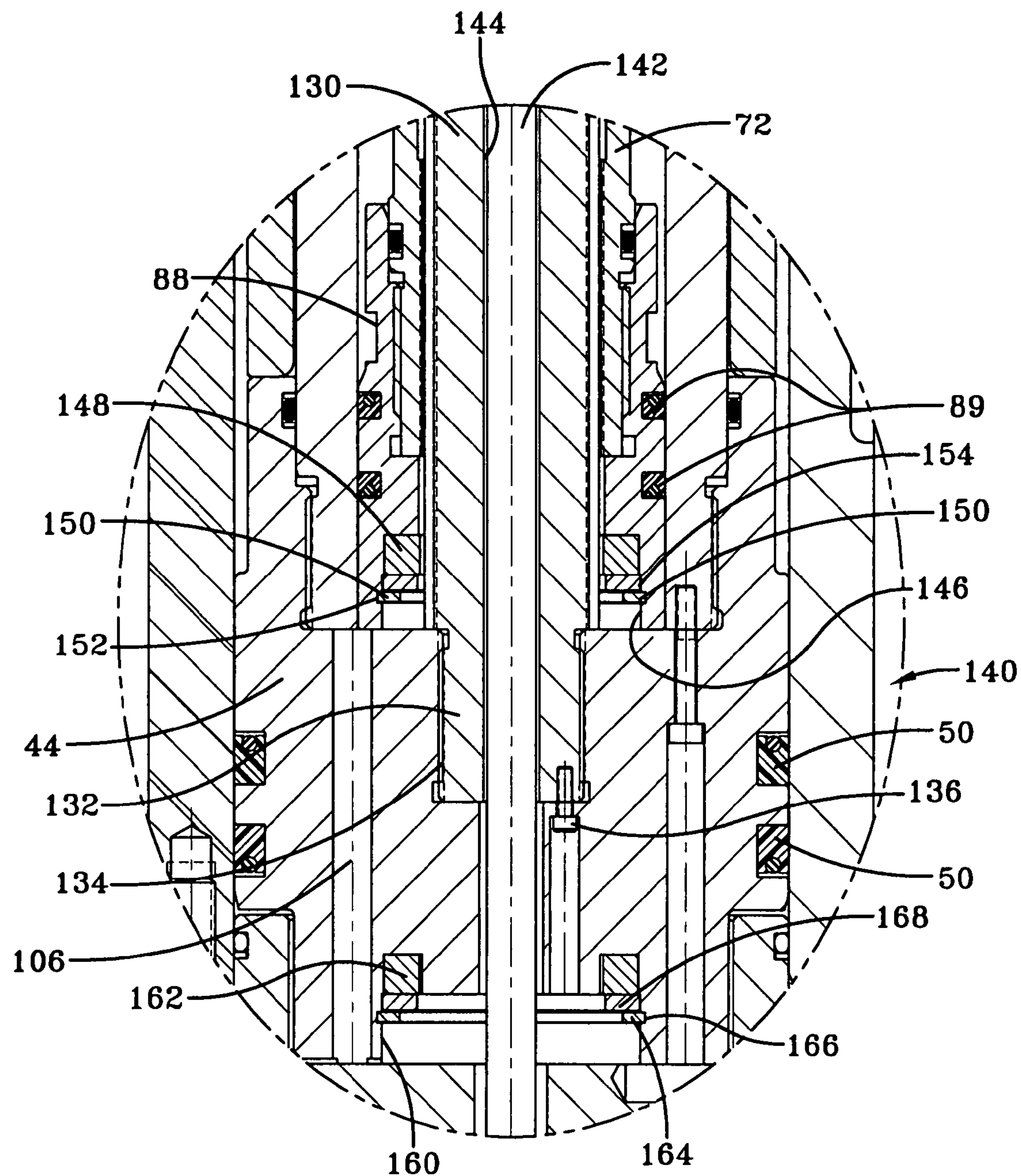
FIG. 6 is an enlarged sectional view of the position monitoring system.

Referring now to FIG. 6, the center mechanism of the present invention further includes a position monitoring system, that electronically determines the vertical position of pistons 44 and 88, and correspondingly the vertical locations of bottom and top ring 26 and 62. The system employs a linear variable differential transformer (hereinafter 'LVDT') that is capable of non-contact position sensing. The LVDT includes a central waveguide 142 that extends upwardly from the bottom of the center mechanism 10 and terminates proximate to bolster 18. Waveguide 142 is slidingly received within a center bore 144 of piston guide 130. In the present embodiment, waveguide 142 consists of a nickel-iron alloy and a copper conductor, though other materials may be used as is known in the art. Inner piston 88 includes an annular recess 146 on the bottom surface thereof. Annular recess 146 receives an annular permanent magnet 148 therein. Magnet 148 is retained within recess 144 by a snap ring 150 that is received in a circumferential groove 152 on inner piston 88. In one or more embodiments, snap ring 150 may consist substantially of stainless steel. Optionally an annular spacer 154 may be provided between snap ring 150 and magnet 148. In one or more embodiments, spacer 154 may consist of a non-magnetic material and is particularly useful if snap ring 150 consists of a material having magnetic properties that may affect the magnetic field of permanent magnet 148.

Outer piston 44 includes an annular recess 160 on the bottom surface thereof. Annular recess 160 receives an annular permanent magnet 162 therein. Magnet 162 is retained within recess 160 by a snap ring 164 that is received in a circumferential groove 166 on outer piston 44. In one or more embodiments, snap ring 164 may consist substantially of stainless steel. Optionally a spacer 168 may be provided between snap ring 164 and magnet 162. In one or more embodiments, spacer 168 may consist of a non-magnetic material and is particularly useful if snap ring 164 consists of a material having magnetic properties that may affect the magnetic field permanent magnet 162.

Positional measurement is accomplished by supplying a short current pulse along the copper conductor of waveguide 142. This current generates a circular magnetic field that rotates around the waveguide. Permanent magnets 148 and 162 produce magnetic field lines at right angles to the electromagnetic field so that in the area on waveguide 142, where the fields from either magnet 148 or 162 intersect the field of the waveguide, a magneto-strictive effect causes an elastic deformation of waveguide 142. This deformation propagates along the waveguide in both directions in the form of a mechanical wave. The mechanical wave is converted to an electrical signal by a signal converter (not shown). The position of magnets 148 and 162 can thus be determined based on the propagation time of the mechanical wave. In this manner, the position of outer and inner pistons 44 and 88 can be determined to resolutions down to one thousandth of an inch. The above disclosed approach to positional measurement provides high resolution, eliminates bulky external measurement devices, and provides real-time electronic data.

Thus, it should be evident that the tire curing press center mechanism disclosed herein carries out one or more of the objects of the present invention set forth above and otherwise constitutes an advantageous contribution to the art. As will be apparent to persons skilled in the art, modifications can be made to the preferred embodiment disclosed herein without departing from the spirit of the invention, the scope of the invention herein being limited solely by the scope of the attached claims.

The invention claimed is:

1. A center mechanism for manipulating a bladder in a tire curing press comprising a lower plate ring adapted to carry a lower bead of the bladder, an upper plate ring adapted to carry an upper bead of the bladder, a first piston chamber, a second piston chamber positioned radially interior from said first piston chamber, an outer piston shaft operatively interconnected to said lower plate ring and received at least partially within said first piston chamber, an inner piston shaft operatively interconnected to said upper plate ring and received at least partially in said second piston chamber, an outer piston coupled to the bottom of said outer piston shaft, an inner piston coupled to the bottom of said inner piston shaft, said outer piston being adapted for reciprocating travel within said first chamber and said inner piston being adapted for reciprocating travel within said second chamber, a main port, wherein operating fluid is provided through said main port to selectively raise said outer piston shaft and said inner piston shaft, said main port being in simultaneous fluid communication with said first chamber, beneath said outer piston shaft, and said second chamber, beneath said inner piston shaft, an outer piston port in fluid communication with said first chamber above said outer piston, and an inner piston port in fluid communication with said second chamber above said inner piston, wherein said outer piston port and said inner piston port may be selectively provided with pressurized operating fluid to force said outer piston and said inner piston downward.

2. The center mechanism of claim 1, further comprising an outer cylinder having an axially extending interior bore wherein said first chamber is bounded by said interior bore.

3. The center mechanism of claim 1, wherein said second chamber is bounded by an axially extending central bore within said outer piston shaft.

4. The center mechanism of claim 1, wherein said outer piston includes at least one axially extending bore providing fluid communication between said first chamber and said second chamber.

5. The center mechanism of claim 1, further comprising an upwardly extending, centrally positioned wave guide, wherein said outer piston includes at least one annular magnet and said inner piston includes at least one annular magnet, wherein pulsed electricity supplied to said wave guide creates mechanical waves at said inner piston annular magnet and said outer piston annular magnet, the propagation time of the mechanical waves corresponding to the vertical position of said outer piston and said inner piston.

6. A center mechanism of for manipulating a bladder in a tire curing press comprising a lower plate ring adapted to carry a lower bead of the bladder, an upper plate ring adapted to carry an upper bead of the bladder, a first piston chamber, a second piston chamber positioned radially interior from said first piston chamber, an outer piston shaft operatively interconnected to said lower plate ring and received at least partially within said first piston chamber, an inner piston shaft operatively interconnected to said upper plate ring and received at least partially in said second piston chamber, an outer piston coupled to the bottom of said outer piston shaft, an inner piston coupled to the bottom of said inner piston shaft, said outer piston being adapted for reciprocating travel within said first chamber and said inner piston being adapted for reciprocating travel within said second chamber, a main port, wherein operating fluid is provided through said main port to selectively raise said outer piston shaft and said inner piston shaft, said main port being in simultaneous fluid communication with said first chamber, beneath said outer piston shaft, and said second chamber, beneath said inner piston shaft, and an axially extending guide secured to said outer piston, wherein said inner piston shaft includes an axially extending guide bore, said guide being received in said guide bore and adapted to inhibit relative rotation between said inner piston shaft and said outer piston shaft.

7. The center mechanism of claim 6, wherein said guide includes radially projecting splines and said guide bore includes a grooved portion adapted to engage said splines.

8. A center mechanism for manipulating a bladder in a tire curing press comprising a lower plate ring for carrying a lower bead of the bladder, an upper plate ring for carrying an upper bead of the bladder, an outer piston assembly operative to selectively raise said lower plate ring, an inner piston assembly, positioned inside said outer piston assembly and operative to selectively raise said upper plate ring relative to said lower plate ring, and a guide coupled to said outer piston assembly and adapted to slidingly contact said inner piston assembly to prevent relative rotation therebetween.

9. The center mechanism of claim 8, wherein said outer piston assembly includes an elongated outer piston shaft and an outer piston, and said inner piston assembly includes an inner piston and an elongated inner piston shaft, said inner piston shaft including a central axially extending guide bore, said guide being secured to said outer piston and extending upwardly into said guide bore.

10. The center mechanism of claim 9, wherein said guide includes at least one axially extending spline and said guide bore includes at least one axially extending groove, said spline being slidingly received in said groove.

11. The center mechanism of claim 10, wherein said at least one spline includes a plurality of circumferentially spaced axially extending splines and said at least one groove includes a plurality of circumferentially spaced axially extending grooves.

12. The center mechanism of claim 9, further comprising a first piston chamber adapted to receive said outer piston, and a second piston chamber positioned radially inwardly of said first piston chamber and adapted to receive said inner piston.

13. The center mechanism of claim 12, wherein operating fluid is provided through a main port to selectively raise said outer piston assembly and said inner piston assembly, said main port being in simultaneous fluid communication with said first chamber beneath said outer piston assembly, and said second chamber beneath said inner piston assembly.

14. A center mechanism for manipulating a bladder in a tire curing press comprising an upper plate ring for carrying the upper bead of the bladder and a lower plate ring for carrying the lower bead of the bladder, a first piston chamber, a second piston chamber positioned radially interior from said first piston chamber, an outer piston assembly operative to selectively raise said lower plate ring, an inner piston assembly, positioned inside said outer piston assembly and operative to selectively raise said upper plate ring relative to said lower plate ring, a guide coupled to said outer piston assembly and adapted to slidingly contact said inner piston assembly to prevent relative rotation therebetween, and a main port, wherein operating fluid is provided through said main port to selectively raise said outer piston assembly and said inner piston assembly, said main port being fluidly connected to said first chamber and said second chamber.

15. The center mechanism of claim 14, wherein said outer piston assembly includes an elongated outer piston shaft and an outer piston, and said inner piston assembly includes an inner piston and an elongated inner piston shaft, said inner piston shaft including a central axially extending guide bore, said guide being secured to said outer piston and extending upwardly into said guide bore.

16. The center mechanism of claim 15, wherein said second chamber is bounded by an axially extending central bore within said outer piston shaft.

17. The center mechanism of claim 15, wherein said outer piston includes at least one axially extending bore providing fluid communication between said first chamber and said second chamber.

* * * * *